United States Patent [19]

Hayashi et al.

[11] Patent Number: 4,867,193
[45] Date of Patent: Sep. 19, 1989

[54] APPARATUS FOR CONTROLLING A SOAP CONCENTRATION IN CLEANING SOLVENT

[75] Inventors: Takahiro Hayashi; Takeshi Nakata, both of Otsu, Japan

[73] Assignee: Sanyo Electric Co., Ltd., Japan

[21] Appl. No.: 302,438

[22] Filed: Jan. 26, 1989

[30] Foreign Application Priority Data

Feb. 2, 1988 [JP] Japan .................... 63-23367

[51] Int. Cl.⁴ ............................................. G05D 21/02
[52] U.S. Cl. .......................................... 137/93; 8/142; 68/17 R; 134/57 R
[58] Field of Search ................... 8/142, 158; 68/17 R; 134/57 R; 137/93

[56] References Cited

U.S. PATENT DOCUMENTS 3,013,572 12/1961 Lahti ........................................ 137/93
3,014,178 12/1961 Dunn .................................. 137/93 X
3,729,013 4/1973 Anderson ............................ 137/93

*Primary Examiner*—Robert G. Nilson
*Attorney, Agent, or Firm*—Darby & Darby

[57] ABSTRACT

A soap concentration control apparatus comprising: a pump for supplying a cleaning solvent to a washing tub; a liquid quantity sensor for measuring a quantity of the solvent supplied to the washing tub by the pump; a soap supplying pump for supplying a soap to the washing tub; a sampling container for sampling the solvent; a soap concentration measuring sensor for measuring a soap concentration in the sampled solvent; a setting device for setting a desired soap concentration; an arithmetic device for calculating an operating time of the soap supplying pump required for making a soap concentration of the solvent in the washing tub approach to the set desired soap concentration on the basis of the measured quantity of solvent, the measured soap concentration and the soap supplying capacity per unit time of the soap supplying pump; and a controller for operating the soap supplying pump on the basis of the calculation result of the arithmetic device, which is useful to maintain a desired soap concentration in the dry cleaning machine thereby providing a constant finish of the laundry.

8 Claims, 12 Drawing Sheets

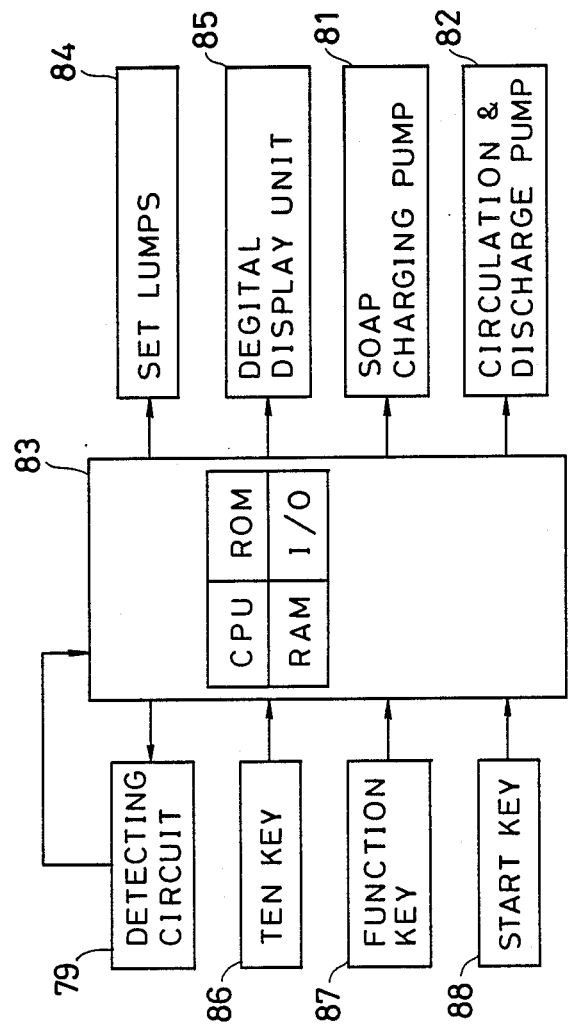

APPARATUS FOR CONTROLLING A SOAP CONCENTRATION IN CLEANING SOLVENT

BACKGROUND OF THE INVENTION

1. Filed of the Invention

The present invention relates to an apparatus for controlling a soap concentration in cleaning solvent used in a dry cleaning machine.

2. Description of the Prior Art

An example of a measuring method of soap concentration of solvents has been disclosed in Japanese Patent Publication No. 21397/1977. According to this method, a surfactant as soap is charged to a dry cleaning solvent, an antistatic preventive agent is mixed therein, and an electrostatic charge quantity on clothing is measured with an electroscope after cleaning and drying of the clothing. Then, the soap concentration is measured on the basis of the opening angle between the leaves of the electroscope.

However, it is difficult to detect the concentration during the cleaning operation with this method. Accordingly, it has been proposed, in a dry cleaning machine using 1,1,1-trichloroethane as the solvent, to dispose a soap concentration detector in a solvent flow channel, thereby to detect the concentration each time (see Japanese Patent Laid-Open No. 98553/1988). In this method, a high frequency alternating voltage is applied to a pair of electrodes disposed in the solvent and fluctuation of a resistance between the electrodes according to the soap concentration is detected Further, the outline of a control method for soap concentration of cleaning solvent using the latter soap concentration detecting method has been introduced in "WHITE LIFE" No. 43 (issued by Sanyo Electric Tokki Co., Ltd. in October, 1987), page 10 and page 11.

SUMMARY OF THE INVENTION

The present invention provides a soap concentration control apparatus comprising: a pump for supplying a cleaning solvent to a washing tub; liquid quantity measuring means for measuring a quantity of the solvent supplied to the washing tub by the pump; soap supplying means for supplying a soap to the washing tub; a sampling container for sampling the solvent; soap concentration measuring means for measuring a soap concentration in the sampled solvent; setting means for setting a desired soap concentration; arithmetic means for calculating an operating time of the soap supplying means required for time of the soap supplying means; and control means for operating the soap supplying means on the basis of the calculation result of the arithmetic means, wherein the soap concentration measuring means comprises: a pair of electrodes provided in the sampling container; a power supply for applying an alternating voltage between the electrodes through a resistance; a memory for storing reference data as the relationship among voltages between the electrodes and the soap concentration; and conversion means for converting the voltage between electrodes to the soap concentration on the basis of the reference data.

For instance, the solvent of 50 to 150 l in volume is required for a laundry of 20 kg in weight in order to remove mainly oily dirt. An ethane solvent, parchloroethylene, petroleum solvent and fluorine solvent are used as the solvent.

A small amount (1% or less) of soap is added to the solvent in order to increase the detergency and prevent the recontamination of the laundry, the corrosion of a cleaning machine, and so forth, thereby to improve the finish of the laundry. Chloropearl (manufactured by NIPPON OIL & FATS CO., LTD.), New Ethane Soap (manufactured by GENBU SOAP & SYSTEMS CO., LTD.), La Foret (manufactured by Nikka Chemical Co., Ltd.) and so forth are used as the soap.

According to the apparatus of the present invention, it is able to measure a soap concentration of cleaning solvent with high accuracy at the stage of cleaning operation and automatically maintain a desired soap concentration for any solvent quantity and any combination of the solvent and the soap determined by the user, thereby to obtain the finish of the laundry as desired.

BRIEF DESCRIPTION OF THE DRAWINGS

FIG. 16 is a control block diagram of the device shown in FIG. 14.

DESCRIPTION OF THE PREFERRED EMBODIMENTS

Figure 1:
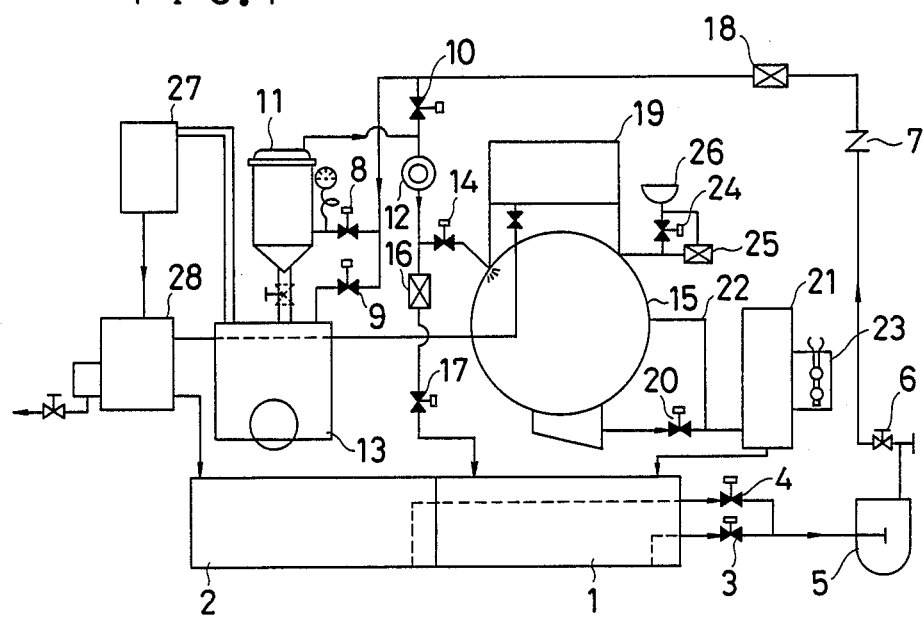
FIG. 1 is a piping block diagram of a dry cleaning machine according to the present invention.

The piping structure of a cleaning machine will be explained with reference to FIG. 1. A reference numeral 1 denotes a first tank which contains solvent for cleaning, and 2 denotes a second tank which contains solvent for rinsing (the second bath), which are connected to the suction side of a pump 5 through main valves 3 and 4, respectively. The delivery side of the pump 5 is connected to a filter valve 8, a distillation valve 9 and a bypass valve 10 through a manual valve 6 and a check valve 7. The filter valve 8 is communicated with a sight glass 12 (for looking at the flow of the solvent) through a filter 11, the distillation valve 9 is communicated with a distiller 13, and the bypass valve 10 is communicated with the sight glass 12. Pipings are installed from the sight glass 12 to a washing tub 15 through a liquid supply valve 14 and to the first tank 1 through a soap concentration detector 16 and a circulation valve 17. In addition, flow quantity detecting means 18 having a flow rate sensor which outputs a signal when solvent flow reaches or exceeds a predetermined value are provided on the delivery side of the pump 5.

The above mentioned washing tub 15 contains inside a rotary drum (not shown) which rotates at a low speed at the time of washing and drying and rotates at a high speed at the time of drainage, and a solvent withdrawal circuit 19 for the purpose of also making the washing tube 15 serve as a drying chamber. This washing tub 15 is connected at the bottom thereof to the first tank 1 through a drainage valve 20 and a button trap 21, and a predetermined height thereof is connected to the first tank 1 through an overflow channel 22 and the button trap 21. Further, liquid level detecting means 23 including, for example, a float switch, a lead switch, a pressure sensor or so forth are attached to the button trap 21 to operate when the liquid level in the washing tub 15 reaches a predetermined level.

Also, at another height of the washing tub 15 is connected with a soap container 26 through a manual valve 24 and an automatically quantitative pump 25 in a parallel manner. Besides, these soap supply means may be provided on the first tank 1.

A soiled solvent is sent to the distiller 13 through the distillation valve 9 for distillation. The vaporized solvent which has been distilled by the distiller 13 is condensed and liquefied by being cooled with a cooler 28, and returns to the second tank 2 after water separation by a water separator 28.

At the time of drying the laundry, the solvent in the washing tub 15 is returned to the first tank 1 through the valve 20, and the washing tub 15 is heated by a heater contained in a solvent salvage circuit 19 in order to have the solvent remaining in the laundry evaporate. The solvent which has been evaporated from the laundry is cooled and liquefied by a cooler contained in the solvent salvage circuit 19 and thereafter returns to the second tank 2 after water separation by the water separator 28.

In the next place, the structure of the detector 16 forming soap concentration measuring means will be explained with reference to FIG. 2. A reference numeral 29 denotes a cylindrical container which externalizes the detector 16, which is formed by welding stainless steel plates. A connecting port to the sight glass 12 is provided on an upper plate thereof, and a connecting port to the circulation valve 17 is provided on a bottom plate thereof. A metallic joint 31 is made to penetrate through the bottom plate through teflon packings 30 for water seal and electrical insulation. A bar-shaped electrode 32 made of stainless steel is screwed into the joint 31 inside the container, and nuts 33 for a terminal screws up the joint 31 outside the container. Furthermore, on the bottom plate is screwed a screw 34 for another terminal to make the container 29 itself serve as an electrode.

Figure 3A:
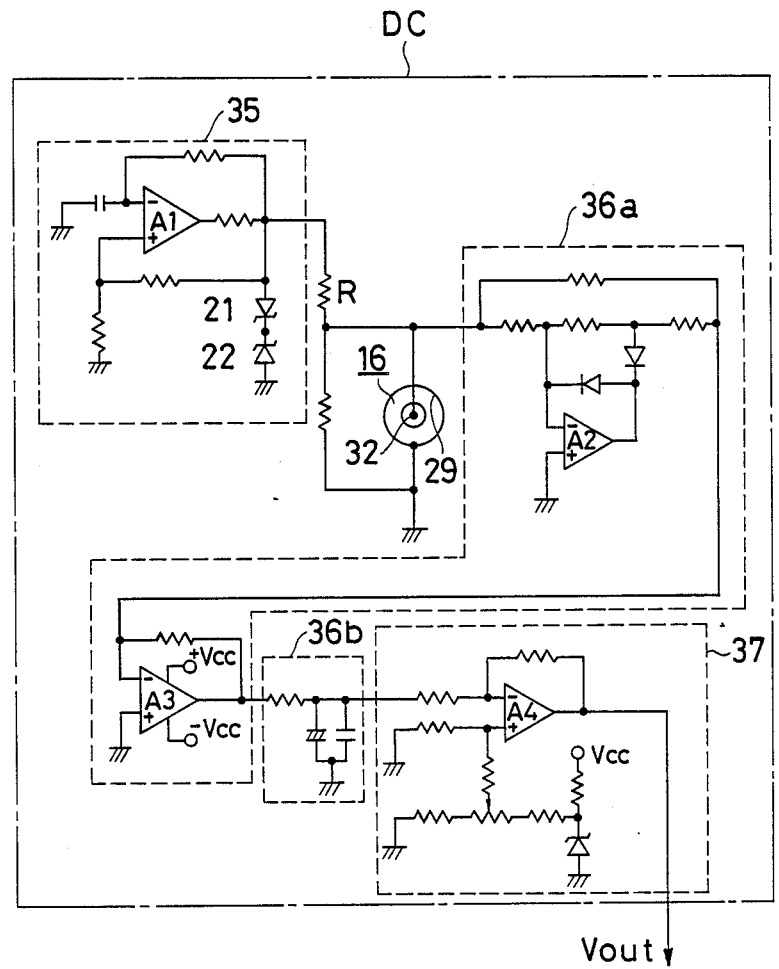
FIG. 3a is a measurement circuit diagram.
Figure 4:
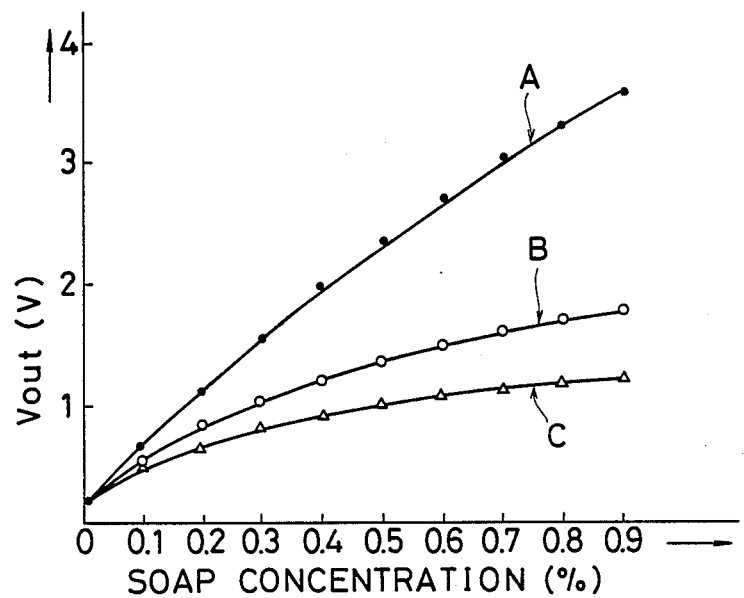
FIG. 4 is a characteristic diagram representing soap concentration versus output voltage concerning three types of soap.

The container 29 and the electrode 32 are connected electrically to a detection circuit DC through the screw 34 and the nuts 33, respectively. Explaining with reference to FIG. 3a, a reference numeral 35 denotes an oscillation circuit in the detection circuit DC, and the oscillation circuit 35 applies an alternating voltage of ±5V, 10 kHz through a resistance R between the container 29 and the electrode 32. An impedance formed by the solvent and the soap located between the container 29 and the electrode 32 varies with the soap concentration. Therefore, a peak value of the alternating voltage between the container 29 and the electrode 32 also varies according to the soap concentration. When this alternating voltage is rectified by a full-wave rectification absolute value circuit 36a and smoothed by an integration circuit 36b, it becomes a d.c. voltage corresponding to the soap concentration. This d.c. voltage is input through a level shift circuit 37 as a voltage Vout to a microcomputer (hereafter referred to as micon) 38 which controls the whole of the cleaning machine. Presumably, FIG. 4 shows a characteristic diagram representing concentrations of soaps A, B and C versus the output voltage Vout.

Figure 3B:
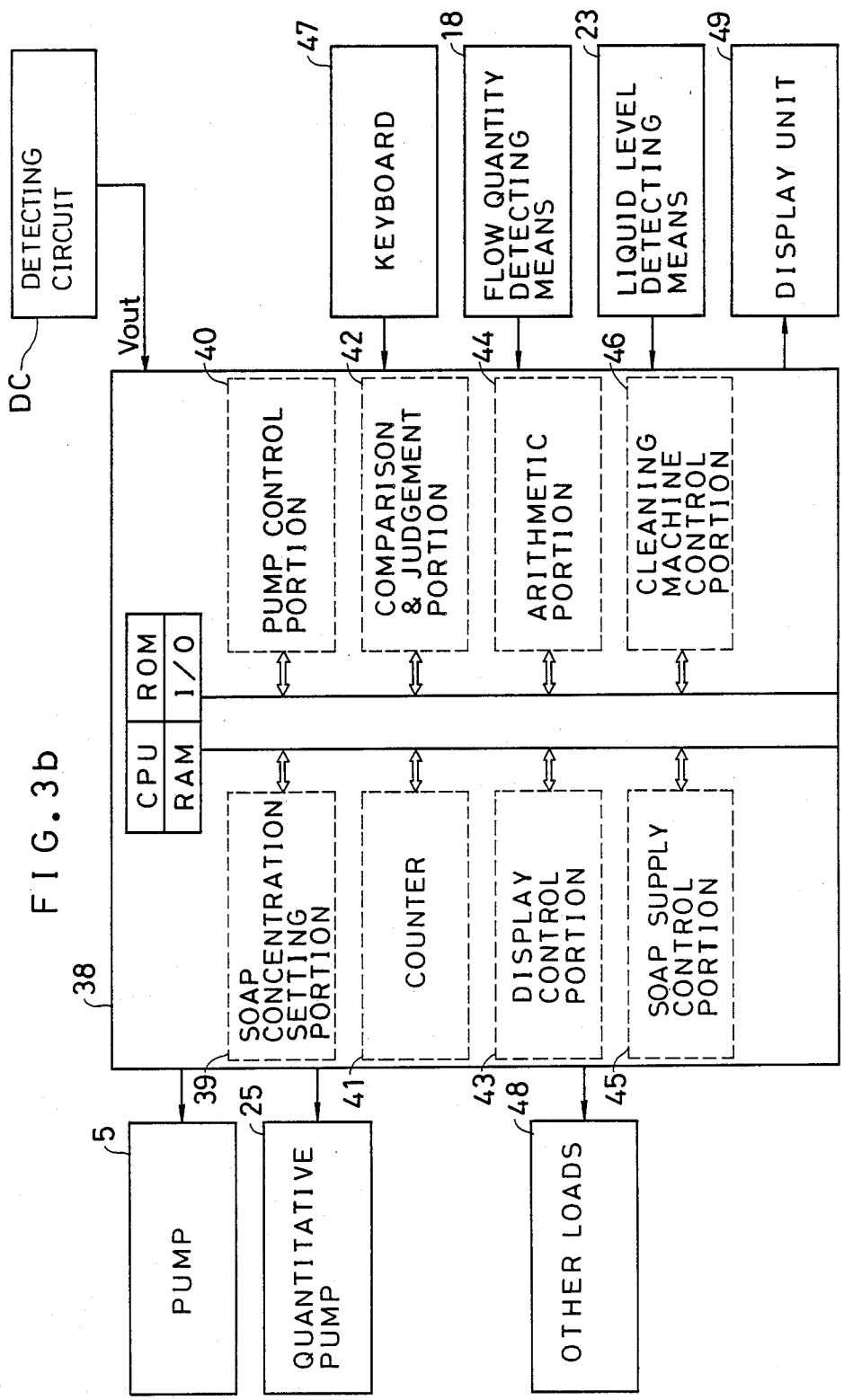
FIG. 3b is a control block diagram.

As shown in FIG. 3b, the aforesaid micon 38 includes a CPU (Central Processing Unit), a ROM (Read-Only Memory), a RAM (non-periodical Random Access Memory) and I/O (Input/Output Port) to form a soap concentration setting portion 39, a pump control portion 40, a counter 41 that forms liquid quantity measuring means along with the flow quantity detecting means 18 and the liquid level detecting means 23, a comparison and judgment portion 42, a display control portion 43, an arithmetic portion 44, a soap supply control portion 45 and a cleaning machine control portion 46.

The micon 38 receives respective signals from the flow quantity detecting means 18, the liquid level detecting means 23, and a keyboard 47 which is operated so as to input information of a desired soap concentration, start signal and so forth, and outputs signals to the pump 5, the quantitative pump 25, other load elements 48 of the cleaning machine and a digital display unit 49.

Next, the control operation of the micon 38 in the present embodiment will be explained. Reference data on the concentration of used soap versus the output voltage, a predetermined flow quantity value and so forth have been stored in the ROM in advance. When a desired concentration Cy is designated with the keyboard 47, this concentration Cy is set at the soap concentration setting portion 39. When cleaning operation is started with the start signal, first, the liquid supply valve 14 and the bypass valve 10 are closed and the main valve 3, the filter valve 8 and the circulation valve 17 are opened by the cleaning machine control portion 46. Thereafter the pump 5 is driven by the pump control portion 40. Then, the solvent discharged from the first tank 1 is returned again to the first tank 1 through the filter 11 and the detector 16. In the interim, the filter 11 has been applied with pre-coat processing. When the liquid supply valve 14 is opened and the circulation valve 17 is closed, the pump 5 start supplying the solvent to the washing tub 15. On the other hand, since the flow quantity of the pump 5 has been detected by the flow quantity detecting means 18, a detected signal is input to the micon 38 when the flow quantity reaches a predetermined value of 100 l/min for instance. In the micon 38 the detected signal starts the counter 41 counting time, and the counter 41 measures a liquid supply time T until the liquid level of the tub 15 rises and a liquid level detection signal is input to the micon 38 from the liquid level detecting means 23. Thereafter, the pump 5 is stopped by the pump control portion 40.

On the other hand, the detector 16 stores the solvent in the container 29 after the circulation valve 17 is closed, and the output voltage Vout of the detection circuit DC is output here to the micon 38 as explained previously. The micon 38 compares the output voltage with the reference data by means of the comparison and judgment portion 42 to measure the soap concentration and displays it on the display unit 49 through the display control portion 43. A soap concentration Cx thus measured, the set soap concentration Cy and the counted time T are input into the arithmetic portion 44 of the micon 38. To this arithmetic portion 44, a constant A of a soap supply system has been further input from the ROM, and calculation is performed here based on the following expression:

$$(T/A) \cdot (Cy - Cx), \text{ here } Cy > Cx.$$

The result of this calculation represents the operating time of the quantitative pump 25 as soap supplying means, and the soap supply control portion 45 of the micon 38 operates the quantitative pump 25 by this period of time.

In such a manner, the soap concentration approaches to the set value Cy, and the finish of the laundry may be expected as desired.

In this embodiment, the detector 16 is connected to the circulation valve 17 so as to measure the soap concentration at the time of filter circulation, but the detector 16 may be connected to a liquid supply channel to the washing tub 15 or a liquid discharge channel so as to increase the times of measurement and improve the measurement accuracy.

Figure 5:
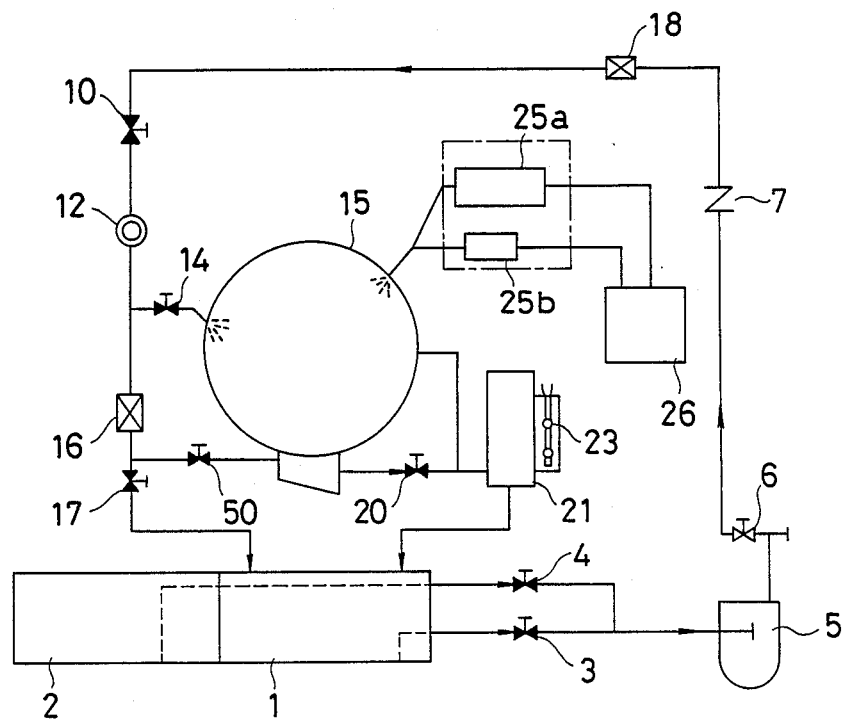
FIG. 5 is a piping block diagram of another embodiment.
Figure 6:
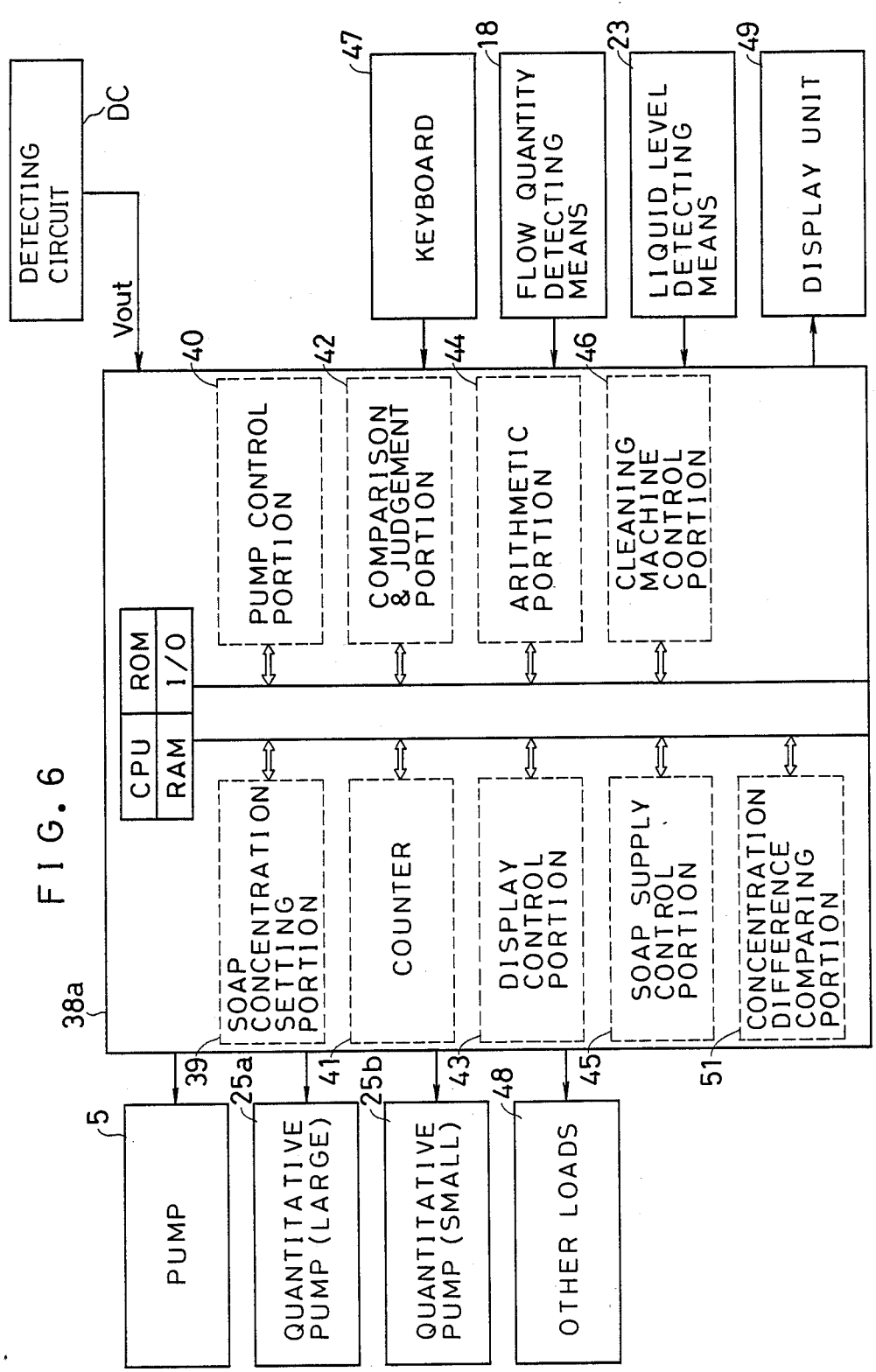
FIG. 6 is a measurement and control block diagram corresponding to that shown in FIG. 5.
Figure 7:
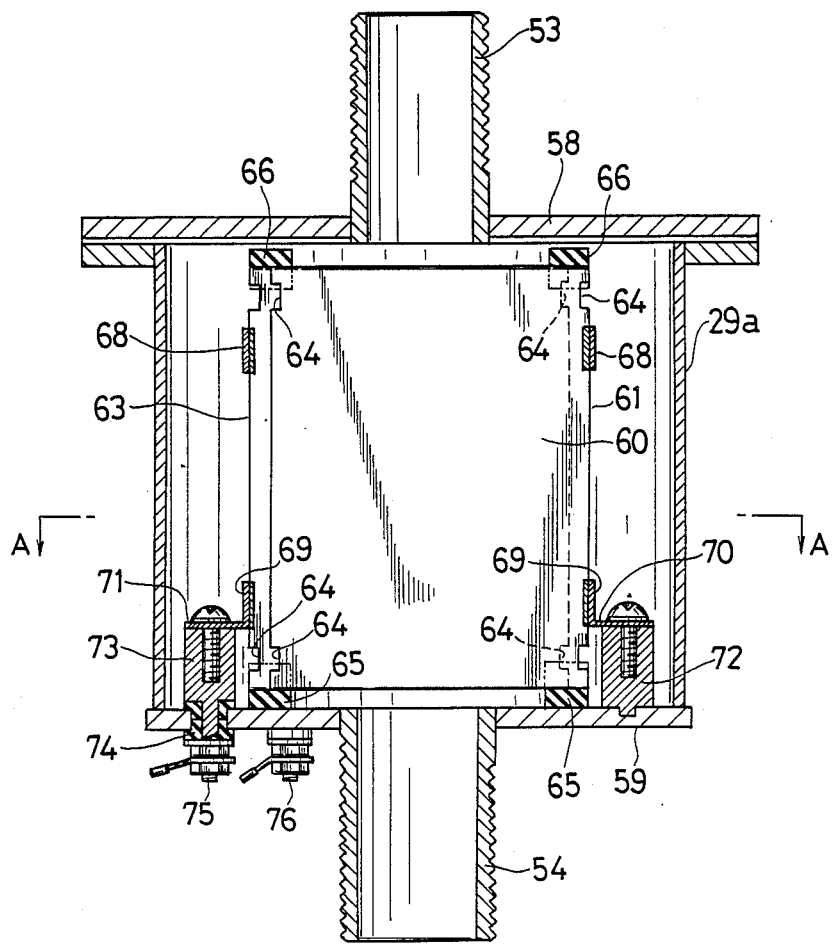
FIG. 7 is a cross-sectional view of another detector.
Figure 9:
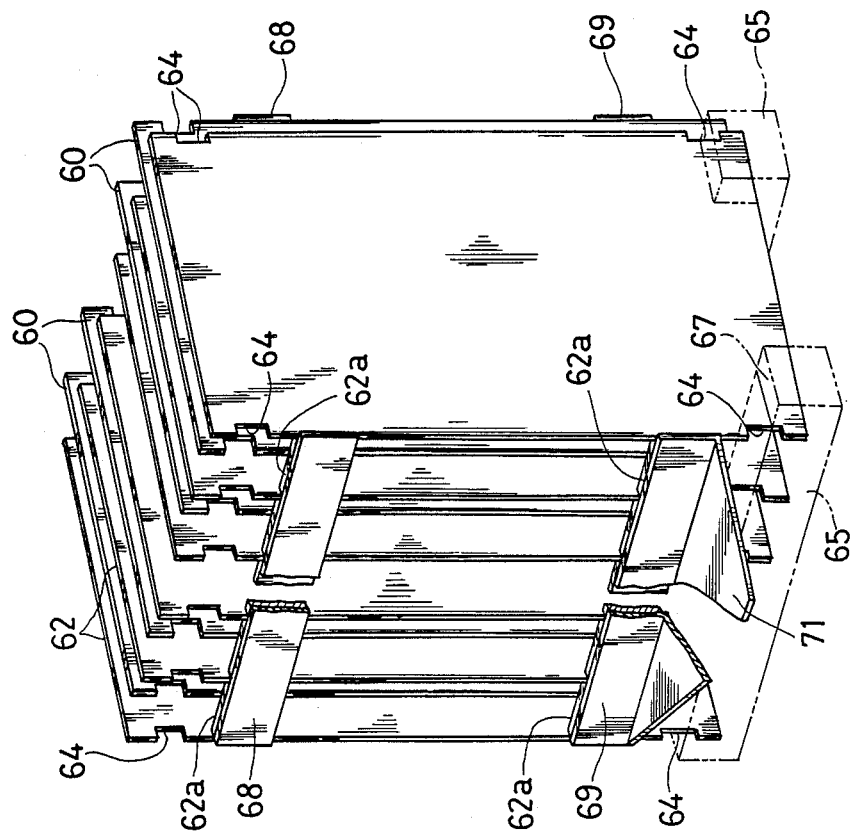
FIG. 9 is a perspective view of a principal part of FIG. 7.
Figure 8:
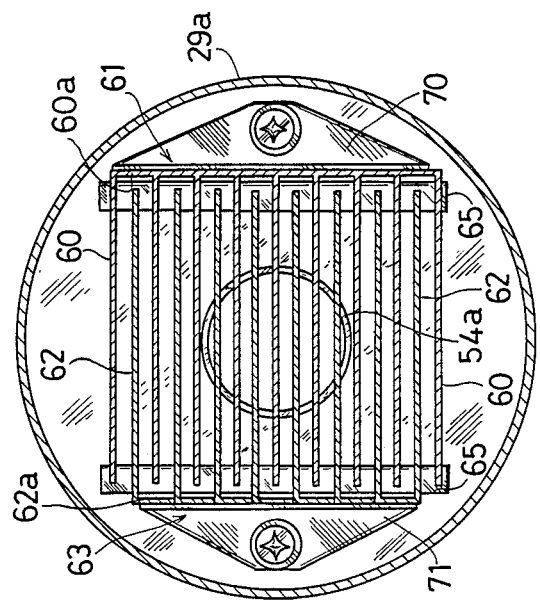
FIG. 8 is a cross-sectional view taken along A—A' shown in FIG. 7.
Figure 10A:
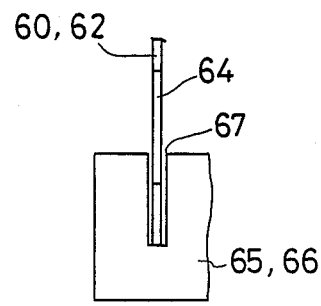
FIG. 10a and FIG. 10b are side views showing the state of installing the electrode shown in FIG. 7.
Figure 10B:
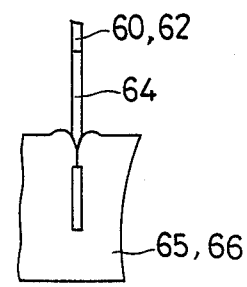

FIG. 5 and FIG. 6 explain another embodiment of the present invention. As compared with the structure shown in FIG. 1, the bottom portion of the washing tub 15 is connected to a piping between the detector 16 an the circulation valve 17 through a connecting valve 50, and a quantitative pump 25a having a large capacity and a quantitative pump 25b having a small capacity are provided as soap supply means. As compared with the structure shown in FIG. 3b, a micon 38a further includes a concentration difference comparing portion 51 which compares a threshold value Cz stored in the ROM in advance with Cy−Cx.

Then, when the desired concentration Cy is designated with the keyboard 47, this value Cy is set at the soap concentration setting portion 39. The connecting valve 50 is closed and the operation is started with the start signal in the same manner as the previous embodiment. When the liquid supply is stopped, the output voltage Vout of the detection circuit DC is input into the micon 38a, and the soap concentration Cx is measured. The micon 38a performs calculation of the concentration difference Co=Cy−Cx by the arithmetic portion 44 and then compares Cz with Co to see if Cz<Co by the concentration difference comparing portion 51. When such condition is satisfied, the micon 38 performs calculation in the arithmetic portion 44 in accordance with the following expression.

$$(T/A_1) \cdot Co$$

Here, $A_1$ is a constant related to the quantitative pump 25a.

The operating time of the quantitative pump 25a having a large capacity is obtained from this expression, and the soap supply control portion 45 of the micon 38a has the quantitative pump 25a operate by the period of the aforesaid operating time so as to charge the soap additionally.

On the contrary, if Cz≧Co, the micron 38a performs calculation of the following expression in the arithmetic portion 44, and the soap supply control portion 45 has the quantitative pump 25b operate by the period of the calculation time so as to charge the soap additionally.

$$(T/A_2) \cdot Co$$

Here, $A_2$ is a constant related to the quantitative pump 25b.

As described above, the soap is charged delicately or comparatively roughly in accordance with the value of the concentration difference Co so that the soap is charged with high speed and high accuracy.

During the cleaning operation after supplying the solvent, the solvent having been located in the detector 16 is returned to the first tank 1 by opening the bypass valve 10 and the circulation valve 17. The connecting valve 50 is then opened after closing the circulation valve 17, and a part of the solvent in the washing tub 15 is introduced into the detector 16, since the detector 16 is located lower than the lowest liquid level in the tub 15. The soap concentration in the introduced solvent has become higher because the soap has been charged additionally. Here, the output voltage Vout is detected again, and the concentration difference Co is calculated by the similar technique as described above. Thereafter, the same processing is executed until Co reaches zero.

Figure 2:
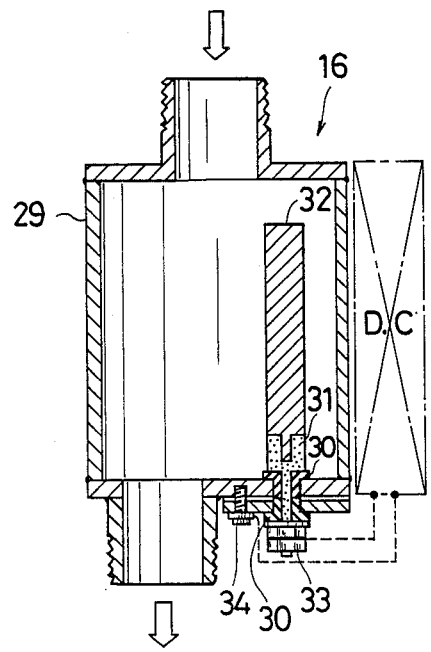
FIG. 2 is a cross-sectional view of a detector.

The detector 16 shown in FIG. 2 is suitable for detecting soap concentration of ethane solvents.

However, the detection is difficult in case of petroleum solvents or perchloroethylene solvents. One of the reasons is that the dielectric constant of the ethane solvent is approximately 7.5 at 25° C., but that of the petroleum solvent or the perchloroethylene solvent is smaller and approximately 2. That is, the Coulomb force between ions becomes larger in inverse proportion to the dielectric constant, causing it difficult to draw ions apart. Also, another reason is that the soap used for the petroleum solvent and ethylene solvent is obtained by compounding a plurality of surfactants such as an anion-nonionic or cation-nonionic surfactant, but the mixed quantity of surfactants containing polar groups (anion or cation) is small. In other word, because it is to detect the ionization property and the ionized quantity of ions in nonaqueous liquid to detect the resistance between the electrodes, the detection becomes difficult inevitably if the quantity of material to be ionized is small.

FIG. 7 thru FIG. 10 show a detector which is able to detect the soap concentration accurately in any solvent among ethane solvents, petroleum solvents and ethylene solvents by making the electrode area large and the distance between the electrodes small In FIG. 7 thru FIG. 10, a metallic container 29a includes upper and lower plates 58 and 59 having an inlet 53 and an outlet 54, respectively, and houses a first electrode 61 formed by having 9 pieces of metallic plates 60 . . . standing close together at equal intervals and a second electrode 63 formed by having 8 pieces of metallic plates 62 . . . standing close together at equal intervals between the respective metallic plates 60 . . . and being disposed opposite to said plates 60 . . . The respective plates 60 . . . and 62 . . . are made of stainless steel and are provided with cutouts 64 . . . at four locations on side edges of upper and lower portions thereof. Four corner portions at their upper and lower ends are fixed to bases 65, 65 and caps 66, 66 composed of resin having superior anti-corrosion and insulation property by inserting them into slits 67 . . . until their cutouts 64 . . . . As the results, the mutual intervals between the respective plates 60 . . . and 62 . . . are ensured. Furthermore, after insertion as shown in FIG. 10a, the upper portions of the slits 67 . . . corresponding to the cutouts 64 . . . are buried by fusing with heating as shown in FIG. 10b, thereby to integrate all of the plates 60 . . . and 62 . . . , the bases 65, 65 and the caps 66, 66. Also, coupling bands 68 and 69 are coupled with bent pieces 60a . . . of the side ends of the plates 60 . . . by means of spot welding at the upper and lower portions of the plates 60 . . . . Furthermore, coupling bands 68 and 69 are coupled with bent pieces 62a . . . of the side ends of the plates 62 . . . by means of spot welding at the upper and lower portions of the plates 62 . . .

Besides, the lower coupling bands 69, 69 are L-shaped to include current collecting plates 70 and 71, and the current collecting plates 70 and 71 are fixed electrically and mechanically with screws to a first boss 72 and a second boss 73, respectively.

The first boss 72 is fixed by burying to the lower plate 59 of the container 29a, and the second boss 73 penetrates the lower plate 59 in a water-tight manner through a packing 74 made of insulating resin such as teflon. The penetrating end of the second boss 73 forms a second external terminal 75, and a first external terminal 76 is attached fixedly to the lower plate 59 in the neighborhood of the terminal 75

Thus, an appropriately high frequency alternating voltage, for example, of 2 kHz to 100 kHz, is applied across the first and second external terminals 76 and 75 through a resistance, and the output voltage between the terminals is detected corresponding to the soap concentration, and the detected output voltage Vout is processed by the micon 38. The first electrode 61 is kept at the same electric potential as that of the container 29a because of preventing them from forming stray capacity.

In such a manner, respective electrode areas of the first electrode 61 and the second electrode 63 are expanded, and the respective electrodes are disposed so as to be close to each other at a constant interval. Therefore, it is possible to detect the soap concentration in a wide range, and it is also possible to surely detect the concentration even if soap is poor in ionization property.

In general, the characteristic representing the actual soap concentration versus the output voltage Vout of the detecting circuit DC is not linear, but is different according to types of the solvent and the soap and combination thereof. Accordingly, it is not easy to form practical reference data representing the soap concentration versus the output voltage Vout.

Figure 11:
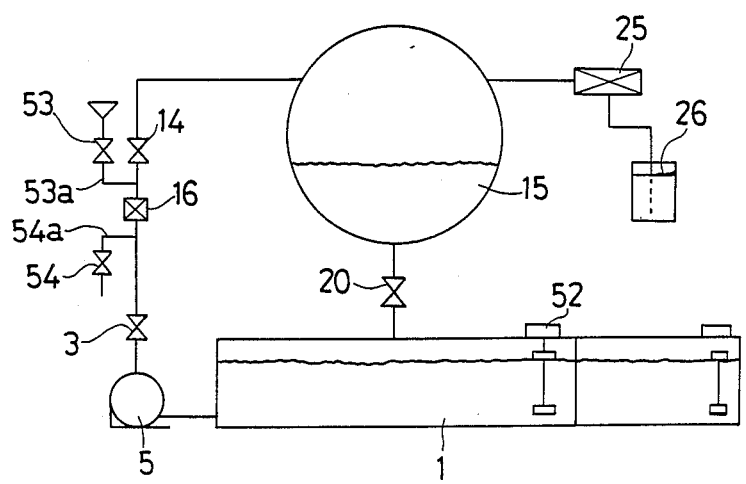
FIG. 11 is a piping block diagram of still another embodiment.
Figure 12:
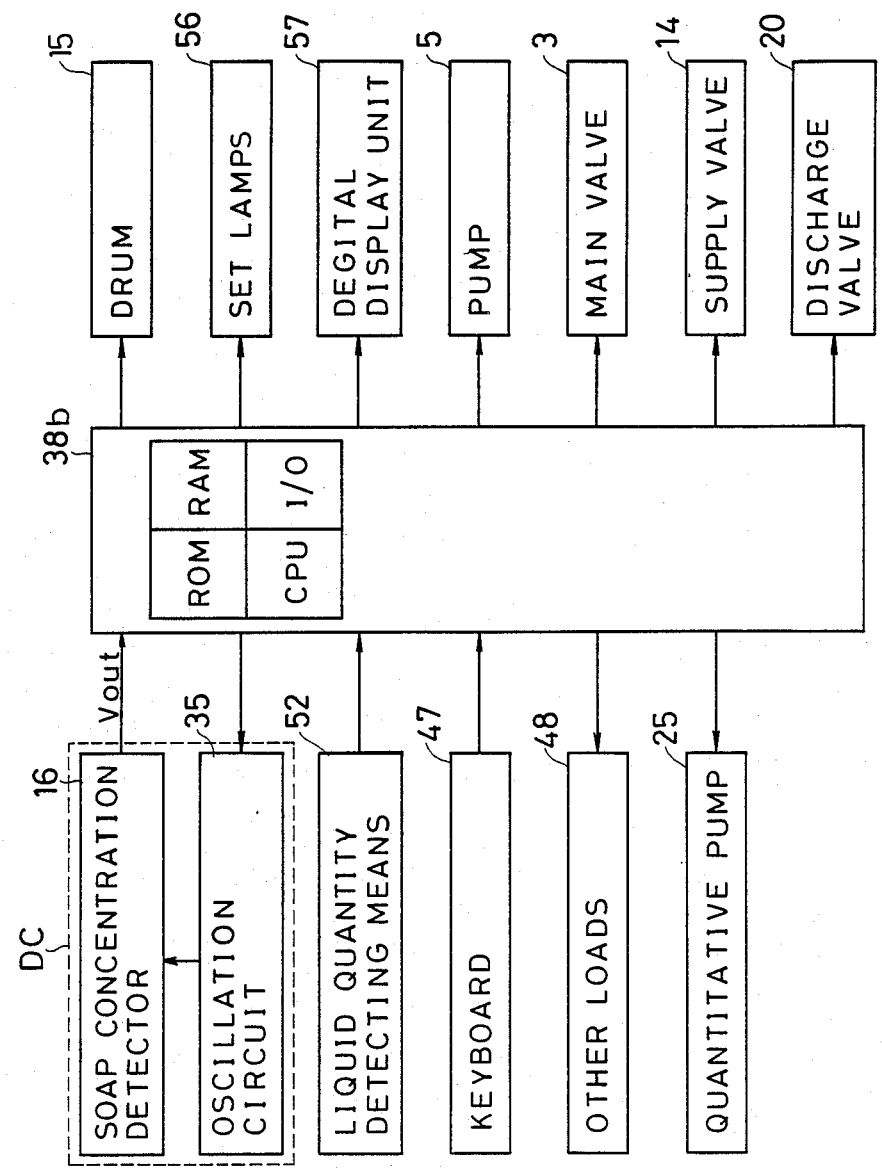
FIG. 12 is a control block diagram corresponding to that shown in FIG. 11.
Figure 13:
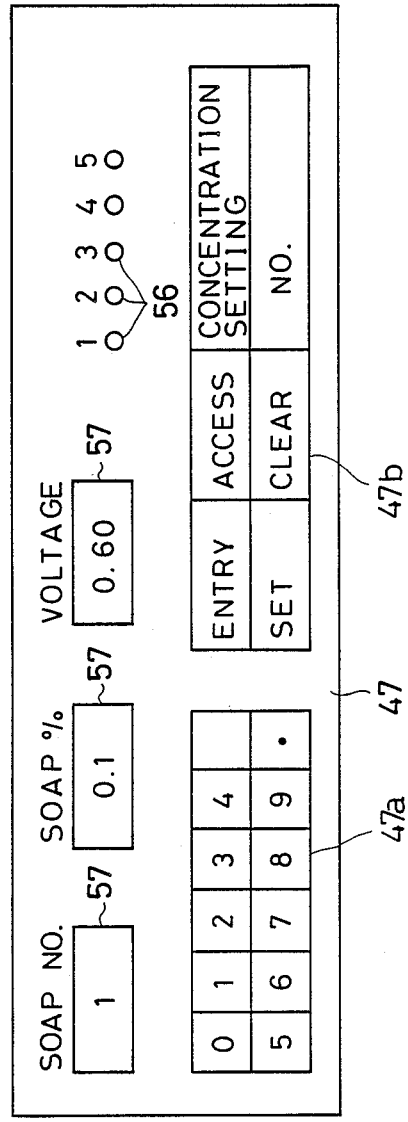
FIG. 13 is a front view of a keyboard of the apparatus shown in FIG. 11.

FIG. 11 thru FIG. 13 show embodiments for principally explaining a technique to easily form the reference data representing the soap concentration versus the output voltage by utilizing a cleaning machine to be operated. FIG. 11 shows a piping system diagram of a dry cleaning machine, in which a drum (not shown) is installed rotatably in the washing tub 15, liquid quantity detecting means 52 such as a float switch is provided in the tank 1, and a liquid supply channel and a liquid discharge channel are provided independently between the washing tub 15 and the tank 1. The pump 5, the main valve 3, the detector 16 and the liquid supply valve 14 are connected in series through the liquid supply channel to the washing tub 15, and the liquid supply valve 20 is connected through the liquid discharge channel to the tank 1.

The above mentioned washing tub 15 and the soap tank 26 are connected via the quantitative pump 25, and a liquid supply valve 53 and a liquid discharge valve 54 for inspection are connected to the above mentioned detector 16 through duct lines 53a and 54a branched from the liquid supply channel.

The operation control of the dry cleaning machine is mainly performed by control means with a micon 38b, and the control circuit and the operating portion are shown in FIG. 12 and FIG. 13, respectively. The micon 38b receives the supply liquid quantity signal from the liquid quantity detecting means 52, the output signal Vout from the detecting circuit DC including the detector 16 and the oscillation circuit 35 and key signals from a ten key 47a including "0" to "9" and "." keys and a function key 47b including "concentration entry", "access", "concentration setting", "set", "clear" and "No." keys of a keyboard 47. The micon 38b outputs power to the oscillation circuit 35, set lamps 56 . . . such as LEDs, etc., digital display units 57 for displaying "soap No.", "soap concentration (%)" and "output voltage (V)", other loads (valves and pumps, etc.) 48 of the cleaning machine, and so on.

First, soap to be used is measured nd mixed in a measured solvent to be used, and thereby a plurality of types of solvents having known concentration are prepared. Then, by operating, for example, the "No." key, the "1" key and the "set" key in turn, the digital display unit 57 displays that the soap of No. 1 has been set. The micon 38b keeps the main valve 3, the liquid supply valve 14 and the liquid discharge valve 54 closed, and keeps the liquid supply valve 53 opened. These valves for inspection may be opened and closed manually. Then, for example, the accurately measured solvent having a soap concentration of 0.1% is put into the detector 16, and "0", "."and "1" are input to the micon 38 by operating the "entry" key and the ten key. Then, the micon 38b displays a concentration of 0.1%, and also feeds power to the oscillation circuit 35 and displays, for example, 0.60 V, i.e., an input of the output voltage Vout. When the "set" key is operated thereafter, the micon 38b stores in the RAM that the soap No. 1 is 0.60 V at a concentration of 0.1%. The finish of the storage may be recognized with the lighting of No. 1 of the set lamps 56. Thereafter, concentrations of 0%, 0.2%, 0.3% and so on and output voltages corresponding to them are stored similarly by substituting the solvent put into the detector 16 for others that have different concentrations. It is desired for the micon 38b to replenish by calculating deficient concentration data between these data.

Once the reference data have been stored in this way, the test solvent is drawn out so as to be ready for practical cleaning operation. In the cleaning operation, for example, the soap No. 1 at a concentration of 0.2% is input by operating "0.2" with the concentration setting key and the ten keys, and the operation is started by operating a start key (not shown). Then, the pump 5 is driven and the main valve 3 and the liquid supply valve 14 are opened, thereby to send the solvent to the washing tub 15 from the tank 1.

Thus, when the supply liquid quantity detection signal and the output voltage Vout are input to the micon 38b, the micon 38b calculates the quantity of the soap required to maintain the concentration of 0.2%, and drives the quantitative pump 25. For example, in case a solvent of 50 l having the initial soap concentration of 0% is supplied to the washing tub 15, a soap of 0.1 l is supplied. Also, when it is know by the output voltage Vout that the soap concentration of the solvent which is supplied to the washing tub 15 at the time of the second cleaning operation is lowered down to 0.18%, the micon 38b calculates a soap quantity of 0.01 l to be added and instructs the pump 25 to drive for the portion.

Moreover, when types of the solvent and soap selected by the user and the combination thereof and the type of the cleaning machine (characteristics of the detector 16 and the detecting circuit DC) are known, it is possible to form the reference data representing the soap concentration versus the output voltage Vout in advance as follows.

Figure 14:
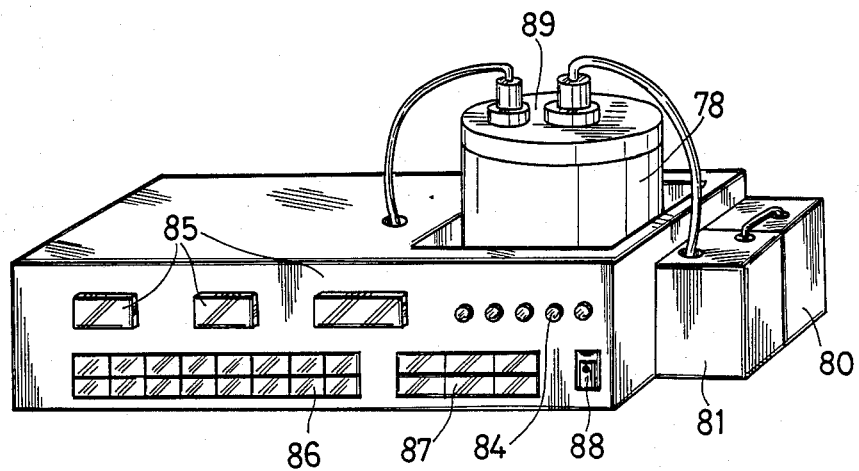
FIG. 14 is a perspective view of a reference data forming device.
Figure 15:
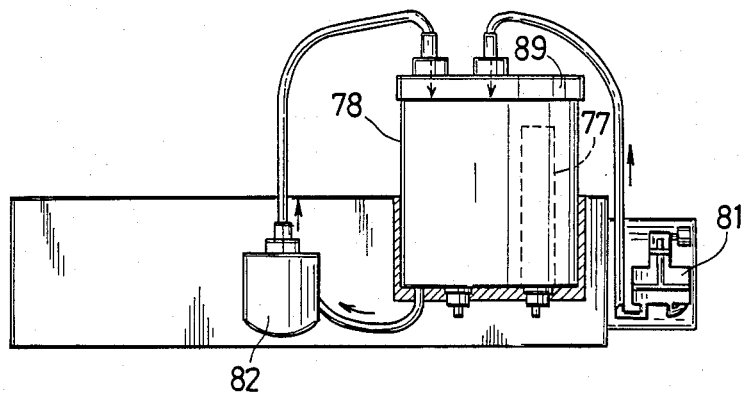
FIG. 15 is a structural explanatory view of FIG. 14.

FIG. 14 thru FIG. 16 show an apparatus which forms automatically and with high accuracy the reference data representing the soap concentration versus the output voltage that are applied to the embodiment shown in FIG. 1. This apparatus includes a container 78 having the substantially same construction as that of the container 29 shown in FIG. 2, an electrode 77 having the substantially same construction as that of the electrode 32 shown in FIG. 2 and a detecting circuit 79 having the substantially same characteristic as that of the detecting circuit DC shown in FIG. 3a, a soap tank 80, a pump 81 which supplies a predetermined quantity of soap to the container 78 from the soap tank 80, a circulation and discharge pump 82 which has a solvent, etc. in the container 78 circulate or discharges, a micon 83 which is capable of controlling the whole data forming works and storing the formed data, a set lamp group 84 composed of LEDs, a digital display unit 85, a ten key 86, a function key 87 and a start key 88.

On an upper cover 89 of the container 78 are detachably fitted discharge pipes of the respective pumps 81 and 82, and a measured solvent of V(l) is put into the container 78 after removing this upper cover 89. Then, the soap No. showing the type of soap, the solvent No. showing the type of solvent, the number of samples and an unit soap concentration of A(%), etc. are input in the micon 83 as input data by the function key 87 and the ten key 86.

Here, when the start key 88 is operated, the pump 81 automatically charges a soap of m(ml) into the container 78. m(ml) is shown by the following expression:

$$m(ml) = (V \cdot A) \cdot 10^{-2} \quad (A < < 100)$$

The circulation and discharge pump 82 is driven in the wake of the pump 81 to mix the solvent and the soap in the container 78 thoroughly by circulation.

In the next place, a high frequency alternating voltage is applied between the electrode 77 and the container 78 by the detecting circuit 79, and the output from the electrode is rectified and smoothed, thus being input in the micon 83 as Vout after level shift.

The micon 83 repeats the sampling operation to obtain output voltages (Vout) by automatic soap charging and solvent circulation, etc. at intervals of A% until a predetermined number of sampling operations are carried out, and receives every time each output voltage Vout. It is desirable that the output voltage Vout is measured also before the soap is charged into the solvent.

Thus, the micon 83 forms characteristics lines (see, for example, FIG. 4) automatically by using mathematical approximation methods such as approximation of the first degree, second degree and minimum square on the basis of respective output voltages measured against respective soap concentrations, and stores them as the reference data. Then, the stored reference data are taken into the micon 38 which controls the operation of the dry cleaning machine shown in FIG. 1 by data transfer technique and so forth.

When the solvent is discharged from the container 78, it is only needed to remove the discharge pipe of the circulation and discharge pump 82 from the upper cover 89 from directing it toward a discharge channel and to drive the pump 82 independently. Such discharge instruction may also be given by utilizing the function key 87, etc.

According to the present invention, it is possible to automatically supply soap corresponding to the quantity of a solvent in a washing tub and to surely maintain a desired soap concentration during cleaning operation, which makes it easy and convenient to operate a dry cleaning machine.

Furthermore, a soap concentration may be adjusted with high accuracy and in a short time, since soap charging capacity is varied in accordance with the value of difference between a set concentration and a measured concentration.

Also, the present invention provides an apparatus which is capable of measuring the concentration accurately even in case of a soap of poor condition in point of ionization property, etc., and therefore is superior in universality.

Moreover, the present invention makes it possible to automatically form reference data required for concentration measurement, thereby to dissolve the complexity of forming data.

What is claimed is:

1. An apparatus for controlling a soap concentration in cleaning solvent comprising:
   a pump for supplying a cleaning solvent to a washing tub;
   liquid quantity measuring means for measuring a quantity of the solvent supplied to the washing tub by the pump;
   soap supplying means for supplying a soap to the washing tub;
   a sampling container for sampling the solvent;
   soap concentration measuring mean for measuring a soap concentration in the sampled solvent;
   setting means for setting a desired soap concentration;
   arithmetic means for calculating an operating time of the soap supplying means required for making a soap concentration of the solvent in the washing tub approach to the set desired soap concentration on the basis of the measured quantity of solvent, the measured soap concentration and the soap supplying capacity per unit time of the soap supplying means; and
   control means for operating the soap supplying means on the basis of the calculation result of the arithmetic means, wherein
   the soap concentration measuring means comprise:
   a pair of electrodes provided in the sampling container;
   a power supply for applying an alternating voltage between the electrodes through a resistance;
   a memory for storing reference data as the relationship among voltages between the electrodes and soap concentrations; and
   conversion means for converting the voltage between electrodes to the soap concentration on the basis of the reference data.

2. An apparatus according to claim 1, in which the electrodes comprises a first electrode having a plurality of metallic plates that are installed in parallel to one another in the sampling container, and a second electrode having a plurality of plates that are installed between the respective plates of the first electrode.

3. An apparatus according to claim 1, in which the sampling container further comprises a reference liquid supplying port and a reference liquid discharging port each having a valve.

4. An apparatus according to claim 3 further comprising write means for writing in the memory as the reference data the voltage between electrodes obtained when a solvent of a known soap concentration is supplied to the sampling container through the reference liquid supplying port.

5. An apparatus according to claim 1, in which the reference data are formed by a data forming unit, and said data forming unit comprises a container and electrodes equivalent to the sampling container and the electrodes, respectively, a power supply equivalent to the power supply which applied an alternating voltage between electrodes equivalent to the electrodes through a resistance equivalent to the resistance, charging means which charge a predetermined quantity of soap into the equivalent container which contains a predetermined quantity of solvent, detecting means which detect a voltage between the equivalent electrodes whenever a soap is charged in the equivalent container, and means for forming data representing soap concentrations versus voltages between the equivalent electrodes.

6. An apparatus according to claim 1, wherein the sampling container is selectively connected with a solvent supply channel from the pump to the washing tub or the washing tub through a valve, the solvent being sampled from the solvent supply channel before a predetermined quantity of solvent is stored in the washing tub, and the solvent being sampled from the washing tub after the predetermined quantity of solvent has been stored in the washing tub.

7. An apparatus for controlling a soap concentration in cleaning solvent comprising:

a pump for supplying a cleaning solvent to a washing tub;

liquid quantity measuring means for measuring a quantity of the solvent supplied to the washing tub by the pump;

soap supplying means supplying a soap to the washing tub;

a sampling container for sampling the solvent;

soap concentration measuring means for measuring a soap concentration in the sampled solvent;

setting means for setting a desired soap concentration;

arithmetic means for calculating the operating time of the soap supplying means required for making a soap concentration of the solvent in the washing tub approach to the set desired soap concentration on the basis of the measured quantity of solvent, the measured soap concentration and soap supplying capacity of the soap supplying means per unit time; and control means for operating the soap supplying means on the basis of the calculation result of the arithmetic means, wherein the soap supplying means comprise at least two soap supplying means having different supply capacities, large and small, the control means further provide means for comparing the difference between the set desired soap concentration and the measured soap concentration with a predetermined value, and the soap supplying means having large supply capacity are operable in case where the difference is bigger than the predetermined value, while the soap supplying means having small supply capacity are operable in case where the difference is smaller than the predetermined value.

8. An apparatus according to claim 7, wherein the sampling container is selectively connected with a solvent supply channel from the pump to the washing tub or the washing tub through a valve, the solvent being sampled from the solvent supply channel before a predetermined quality of solvent is stored in the washing tub, and the solvent being sampled from the washing tub after the predetermined quantity of solvent has been stored in the washing tub.

* * * * *